United States Patent
Vandersleen et al.

(10) Patent No.: US 10,981,172 B2
(45) Date of Patent: Apr. 20, 2021

(54) THERMAL CONTROL SYSTEM FOR CONTROLLING THE TEMPERATURE OF A FLUID

(71) Applicant: Abbott Point of Care Inc., Princeton, NJ (US)

(72) Inventors: Gary J. Vandersleen, Plainsboro, NJ (US); Sergey Gershtein, Skillman, NJ (US); Mitchell Tilson, Franklin Township, NJ (US); Jaymin Patel, Marlboro, NJ (US); Craig H. Schneider, East Windsor, NJ (US); Seth Hunter, Princeton Junction, NJ (US); Paul Wasserman, Oakhurst, NJ (US); Pierre Emeric, Princeton, NJ (US)

(73) Assignee: Abbott Point of Care Inc., Princeton, NJ (US)

( * ) Notice: Subject to any disclaimer, the term of this patent is extended or adjusted under 35 U.S.C. 154(b) by 144 days.

(21) Appl. No.: 14/206,547

(22) Filed: Mar. 12, 2014

(65) Prior Publication Data
US 2014/0263279 A1    Sep. 18, 2014

Related U.S. Application Data

(60) Provisional application No. 61/782,636, filed on Mar. 14, 2013.

(51) Int. Cl.
*G05D 23/30* (2006.01)
*B01L 7/00* (2006.01)
*B01L 3/00* (2006.01)

(52) U.S. Cl.
CPC ............... *B01L 7/00* (2013.01); *G05D 23/30* (2013.01); *B01L 3/5027* (2013.01);
(Continued)

(58) Field of Classification Search
CPC .... G05D 23/30; G05D 23/303; B81B 7/0083; B81B 7/0087; B81B 7/009; B81B 7/0096;
(Continued)

(56) References Cited

U.S. PATENT DOCUMENTS

| 3,853,467 A | 12/1974 | Giaever |
|---|---|---|
| 4,830,959 A | 5/1989 | McNeil et al. |

(Continued)

FOREIGN PATENT DOCUMENTS

| JP | 05-273212 | 10/1993 |
|---|---|---|
| JP | 07-260782 | 10/1995 |
| WO | 03/002965 A1 | 1/2003 |

OTHER PUBLICATIONS

Patent Cooperation Treaty, International Search Report and Written Opinion, International Application No. PCT/US2014/024446, dated Feb. 9, 2015.

(Continued)

*Primary Examiner* — Erin E McGrath
(74) *Attorney, Agent, or Firm* — Kilpatrick Townsend & Stockton LLP

(57) ABSTRACT

The invention relates to a thermal control system for controlling the temperature of a fluid. In particular, the invention relates to a control system having at least two heating elements, at least one of which is used for directly or indirectly heating a fluid, and at least one of which is used for heating a thermal probe used to determine the temperature of the fluid. The heating systems are controlled by at least one feedback controller.

18 Claims, 9 Drawing Sheets

(52) U.S. Cl.
CPC . *B01L 2200/147* (2013.01); *B01L 2300/0645* (2013.01); *B01L 2300/0816* (2013.01); *B01L 2300/0867* (2013.01); *B01L 2300/1827* (2013.01); *B01L 2400/0481* (2013.01)

(58) Field of Classification Search
CPC ..... B01L 7/00; A61J 2200/40; A61J 2200/42; A61J 2200/44; A61J 2200/72
USPC .......................................................... 219/477
See application file for complete search history.

(56) References Cited

U.S. PATENT DOCUMENTS

| | | | |
|---|---|---|---|
| 4,946,651 A * | 8/1990 | Liston | G01N 27/3271 220/506 |
| 4,954,087 A | 9/1990 | Lauks et al. | |
| 4,997,526 A | 3/1991 | Robblee | |
| 5,054,936 A * | 10/1991 | Fraden | G01J 5/16 257/E27.122 |
| 5,063,081 A | 11/1991 | Cozzette et al. | |
| 5,096,669 A | 3/1992 | Lauks et al. | |
| 5,112,455 A | 5/1992 | Cozzette et al. | |
| 5,200,051 A | 4/1993 | Cozzette et al. | |
| 5,447,440 A | 9/1995 | Davis et al. | |
| 5,514,253 A | 5/1996 | Davis et al. | |
| 5,554,339 A | 9/1996 | Cozzette et al. | |
| 5,628,961 A | 5/1997 | Davis et al. | |
| 5,807,752 A | 9/1998 | Brizgys et al. | |
| 5,821,399 A | 10/1998 | Zelin et al. | |
| 5,960,160 A | 9/1999 | Clark et al. | |
| 6,030,827 A | 2/2000 | Davis et al. | |
| 6,436,699 B1 | 8/2002 | Berggren et al. | |
| 6,478,938 B1 | 11/2002 | Paek et al. | |
| 6,582,576 B1 * | 6/2003 | Chow | B01J 19/0093 204/451 |
| 7,682,833 B2 | 3/2010 | Miller et al. | |
| 7,723,099 B2 | 5/2010 | Miller et al. | |
| 2003/0023398 A1 * | 1/2003 | Lantz | G01K 7/42 702/130 |
| 2003/0073229 A1 * | 4/2003 | Greenstein | B01L 7/00 435/287.2 |
| 2003/0148530 A1 * | 8/2003 | Lauks | G01N 33/49 702/23 |
| 2004/0151629 A1 | 8/2004 | Grant et al. | |
| 2004/0222091 A1 * | 11/2004 | Lauks | B01L 3/502707 204/400 |
| 2005/0281314 A1 * | 12/2005 | Fraden | G01K 1/20 374/208 |
| 2008/0032347 A1 * | 2/2008 | Sarofim | B01L 7/52 435/91.2 |
| 2013/0343955 A1 | 12/2013 | Doyle et al. | |

OTHER PUBLICATIONS

Eddowes, Biosensors 3: 1-15, 1087.
Laurell, et al., Methods in Enymology, vol. 73, "Electroimmunoassay", Academic Press, pp. 339, 340, 346-348, 1981.
M.J. Green, 1987, Philos. Trans. R. Soc. Lond. B. Biol. Sci., 316, pp. 135-142.

* cited by examiner

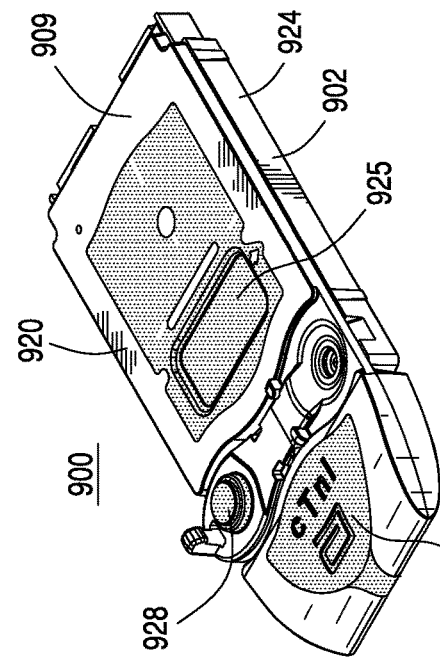
FIG. 11D
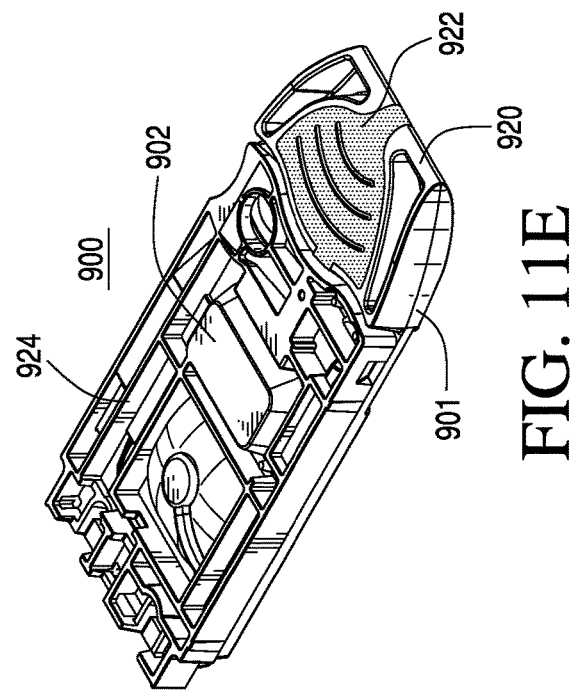
FIG. 11E
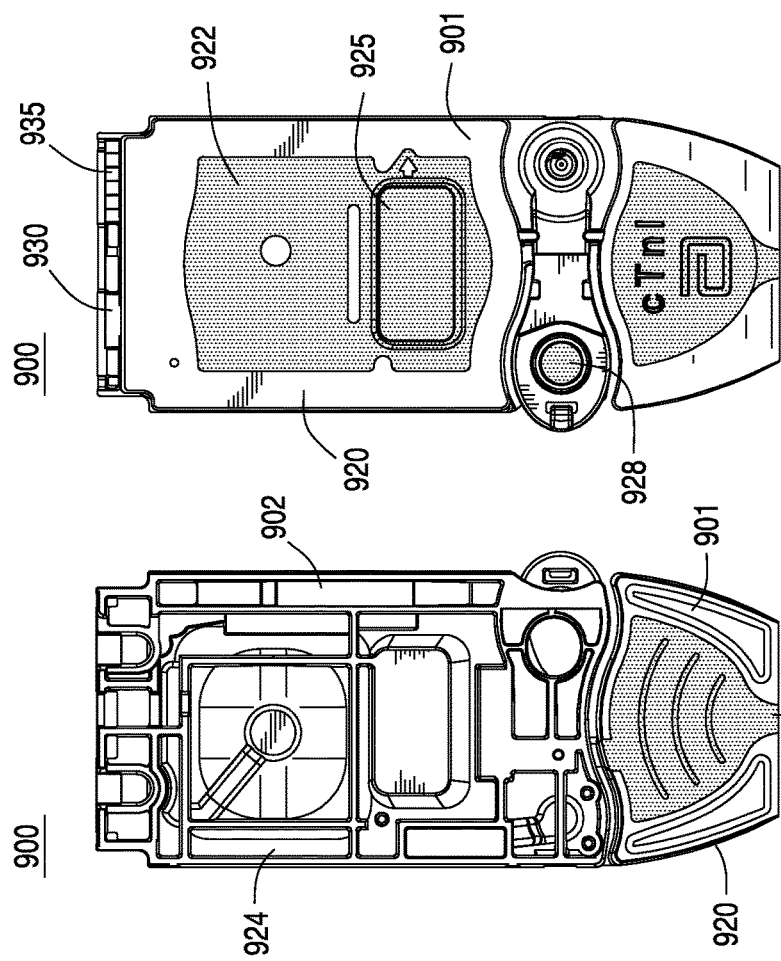
FIG. 11A
FIG. 11B
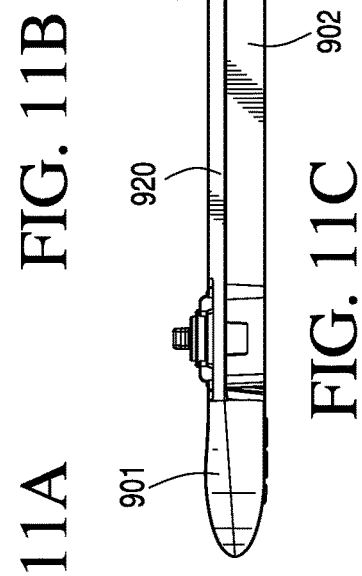
FIG. 11C

THERMAL CONTROL SYSTEM FOR CONTROLLING THE TEMPERATURE OF A FLUID

CROSS-REFERENCE TO RELATED APPLICATION

This application claims priority to U.S. Provisional Application No. 61/782,636, filed on Mar. 14, 2013, the entirety of which is incorporated herein by reference.

FIELD OF THE INVENTION

The invention relates to a thermal control system for controlling the temperature of a fluid. In particular, the invention relates to a control system having at least two heating elements, at least one of which is used for directly or indirectly heating a fluid, and at least one of which is used for heating a temperature sensing probe used to determine the temperature of the fluid. The heating systems are controlled by at least one feedback controller.

BACKGROUND OF THE INVENTION

Thermal control systems for controlling the temperature of a fluid have uses in a variety of contexts, such as when conducting measurements on the fluid that may have temperature dependence. For example, a multitude of laboratory tests for analytes of interest are performed on biological samples for diagnosis, screening, disease staging, forensic analysis, pregnancy testing, drug testing, and other reasons. While the majority of quantitative tests still require the expertise of trained technicians in a laboratory setting using sophisticated instruments, portable sensing systems have been and are continuing to be developed. Many such sensing systems have a need for maintaining small amounts of a fluid, such as blood, at a constant predetermined temperature.

A disposable sensing device for measuring analytes in a sample of blood is disclosed by Lauks in U.S. Pat. No. 5,096,669. Other devices are disclosed by Davis et al. in U.S. Pat. Nos. 5,628,961 and 5,447,440 for a clotting time. These devices employ a reading apparatus and a cartridge that fits into the reading apparatus for the purpose of measuring analyte concentrations and viscosity changes in a sample of blood as a function of time. A potential problem with such disposable devices is variability of fluid test parameters from cartridge to cartridge due to manufacturing tolerances or measurement condition variability. Zelin, U.S. Pat. No. 5,821,399 discloses methods to overcome this problem using automatic flow compensation controlled by a reading apparatus using conductimetric sensors located within a cartridge. U.S. Pat. Nos. 5,096,669, 5,628,961, 5,447,440, and U.S. Pat. No. 5,821,399 are hereby incorporated in their respective entireties by reference.

Antibodies are extensively used in the analysis of biological analytes. For a review of basic principles see Eddowes, Biosensors 3:1-15, 1987. U.S. Pat. No. 5,807,752 to Brizgys discloses a test system in which a solid phase is impregnated with a receptor for an analyte of interest. A second analyte-binding partner attached to a spectroscopically-determinable label and a blocking agent is introduced, and the spatial distribution of the label is measured. Spectroscopic measurements require a light transducer, typically a photomultiplier, phototransistor, or photodiode, and associated optics that may be bulky or expensive, and are not required in electrochemical methods, in which an electrical signal is produced directly.

Electrochemical detection, in which binding of an analyte directly or indirectly causes a change in the activity of an electroactive species adjacent to an electrode, has also been applied to immunoassay. For a review of electrochemical immunoassay, see: Laurell et al., Methods in Enzymology, vol. 73, "Electroimmunoassay", Academic Press, New York, 339, 340, 346-348 (1981).

U.S. Pat. No. 4,997,526 discloses a method for detecting an analyte that is electroactive. An electrode poised at an appropriate electrochemical potential is coated with an antibody to the analyte. When the electroactive analyte binds to the antibody, a current flows at the electrode. This approach is restricted in the analytes that can be detected; only those analytes that have electrochemical midpoint potentials within a range that does not cause the electrode to perform non-specific oxidation or reduction of other species present in the sample by the electrode. The range of analytes that may be determined is extended by the method disclosed in U.S. Pat. No. 4,830,959, which is based upon enzymatic conversion of a non-mediator to a mediator. Application of the aforementioned invention to sandwich immunoassays, where a second antibody is labeled with an enzyme capable of producing mediator from a suitable substrate, means that the method can be used to determine electroinactive analytes.

Microfabrication techniques (e.g., photolithography and plasma deposition) are attractive for construction of multilayered sensor structures in confined spaces. Methods for microfabrication of electrochemical immunosensors, for example on silicon substrates, are disclosed in U.S. Pat. No. 5,200,051 to Cozzette et al., which is hereby incorporated in its entirety by reference. These include dispensing methods, methods for attaching biological reagent, e.g., antibodies, to surfaces including photoformed layers and microparticle latexes, and methods for performing electrochemical assays.

In an electrochemical immunosensor, the binding of an analyte to its cognate antibody produces a change in the activity of an electroactive species at an electrode that is poised at a suitable electrochemical potential to cause oxidation or reduction of the electroactive species. There are many arrangements for meeting these conditions. For example, electroactive species may be attached directly to an analyte (see above), or the antibody may be covalently attached to an enzyme that either produces an electroactive species from an electroinactive substrate, or destroys an electroactive substrate. See, e.g., M. J. Green (1987) Philos. Trans. R. Soc. Lond. B. Biol. Sci. 316:135-142, for a review of electrochemical immunosensors.

The concept of differential amperometric measurement is well known in the electrochemical art. See, for example, jointly owned Cozzette, U.S. Pat. No. 5,112,455. In addition, a version of a differential amperometric sensor combination is disclosed in jointly owned Cozzette, U.S. Pat. No. 5,063,081.

The art contains references to immunosensors for detection of human serum albumin using an antibody to human serum albumin for capture. These include Paek, (U.S. Pat. No. 6,478,938), Berggren (U.S. Pat. No. 6,436,699), Giaever (U.S. Pat. No. 3,853,467), Yamazoe (JP 07260782) and Owaku (JP 05273212).

Miller, U.S. Pat. No. 7,723,099 discusses an immunoassay device with an immuno-reference electrode. The electrochemical measurements made on such samples are temperature dependent. Thus, precise temperature control over the fluid being analyzed is essential for accurate results. Such temperature control can be made difficult by the existence of an offset between the temperature measuring device and the fluid due to an unknown thermal resistance between the two. Further, such devices rely on a relatively small amount of blood or fluid sample. As a result of its small volume and thermal mass, the fluid temperature can be affected by the temperature and heat capacity of the temperature measuring probe itself. Therefore, the need exists for a thermal control system to control the temperature, in particular when the fluid is present in low volume and/or has a relatively low thermal mass.

SUMMARY OF THE INVENTION

One object of the invention is to provide a thermal control system for controlling the temperature of a fluid. In one embodiment, the system comprises a thermally conductive substrate in thermal contact with a fluid; a first heating element in contact with said substrate for heating said fluid; a temperature sensing probe configured to measure the temperature of said fluid with a second heating element for heating the probe; and a feedback controller for maintaining the temperature of the fluid as measured by the temperature sensing probe within a preselected range by controlling the current applied to the first and second heating elements. The feedback controller might also determine the temperature of the fluid from the output of the temperature sensing probe. In certain embodiments the system also includes electrical contacts for connecting to the first heating element and delivering a current. The current can be delivered by a battery. In certain embodiments, the probe indirectly measures the temperature of the fluid by measuring the temperature of the substrate. In other embodiments, the control system can further comprise a pump for displacing the fluid from the substrate and positioning a second fluid, e.g., a calibration fluid, a wash fluid or reagent containing fluid, over the substrate.

In another embodiment, the thermal control system has at least one electrochemical sensor on the substrate which physically contacts the fluid. The sensor might be configured to make potentiometric, amperometric, or conductometric measurements of the fluid in certain embodiments. In some embodiments, the volume of fluid in contact with the electrochemical sensor is between about 1 µL to about 1 mL. In certain cases, the fluid can be housed in a conduit insulated on at least one side by plastic.

In some embodiments, the temperature sensing probe comprises a thermistor for temperature measurement. The temperature sensing probe preferably comprises a resistor for heating the probe and may have a tip made of metal such as aluminum. The tip of the thermal sensing probe preferably has a thermal mass of less than 0.01 J/° C.

The substrate can, in some embodiments, be chosen from the group consisting of silicon, glass, plastic, and alumina, and preferably forms a conduit, or portion of a conduit, through which the fluid passes. In some embodiments, the substrate is about 1 mm thick or less. The substrate may have a bottom coating comprising one or more metals where the first heating element contacts the substrate. In some cases, the substrate can have a thermal mass of less than 0.02 J/° C.

In some embodiments, the control system can be used to maintain the temperature of the fluid within a range, such as ±0.5° C., or ±0.2° C., of a target temperature.

In another embodiment, the invention relates to a method of controlling the temperature of a fluid comprising bringing a fluid into thermal contact with a substrate connected to a first heating element, measuring the temperature of the substrate with a temperature sensing probe connected to a second heating element, applying a current to the second heating element, and controlling the current applied to the first heating element based on the output of the temperature sensing probe using a feedback controller linked to a computer to adjust the temperature of the substrate to a preselected temperature.

Another embodiment involves a thermal control system for controlling the temperature of a sensor, comprising a sensor, a first heating element in thermal contact with said sensor, a temperature sensing probe for measuring the temperature of said sensor, wherein the tip of said temperature sensing probe has a second heating element for heating said probe tip; and a feedback controller for maintaining the temperature of said sensor as measured by the temperature sensing probe by controlling the current applied to the first and second heating elements.

In another case, the invention relates to a device for maintaining the temperature of a component in a cartridge. The device comprises electrical contacts for connecting to a first heating element and delivering a current; a temperature sensing probe configured to measure the temperature of said component, said probe comprising a thermistor and a second heating element for heating the probe; a housing for the temperature sensing probe and the electrical contacts configured for engaging a cartridge and bringing the temperature sensing probe into thermal contact with the component and bringing the electrical contacts into contact with the first heating element; a feedback controller for maintaining the temperature of the component as measured by the temperature sensing probe within a preselected range by controlling the current applied to the first and second heating elements.

BRIEF DESCRIPTION OF DRAWINGS

The invention is described in detail below with reference to the appended drawings, wherein like numerals designate similar parts.

FIGS. 11A-11E show top, bottom, side, and perspective views of an immunosensor cartridge in a closed position in accordance with some aspects of the invention.

DETAILED DESCRIPTION OF THE INVENTION

Introduction

The present invention permits accurate temperature measurement and temperature control of fluids, including in situations where uncertainty in the knowledge of the thermal resistance of between the fluid and the temperature measuring device would otherwise cause inaccuracy in the measurement of the temperature of the fluid as performed by the temperature measuring device. The invention can also address situations where the temperature of the fluid being measured can be affected by the temperature sensing probe itself. The systems permit accurate temperature measurement and control when measuring fluids of particularly low volume, e.g., less than 1 mL. Such systems may also be beneficial when the heat capacity or thermal mass of the tip of the device used to measure the temperature of the fluid is on the order of or greater than the heat capacity or thermal mass of the fluid being measured. For example, in some embodiments, the thermal mass of the fluid may be less than 50 times the thermal mass of the temperature sensing probe tip, e.g., less than 10 times the thermal mass of the temperature sensing probe tip, or less than 5 times the thermal mass of the temperature sensing probe tip, or less than 2 times the thermal mass of the temperature sensing probe tip, or the thermal mass of the fluid may be less than the thermal mass of the temperature sensing probe tip. Thermal mass is equivalent to thermal capacitance or heat capacity, i.e. the ability of a body to store thermal energy.

The invention is directed, in one embodiment, to a thermal control system for controlling the temperature of a fluid, preferably a fluid in an analyte testing device. The system comprises a thermally conductive substrate in thermal contact with a fluid, e.g., a sample fluid such as whole blood. A first heating element is in contact with said substrate for heating the fluid. The system also includes a temperature sensing probe configured to measure the temperature of said fluid. The temperature sensing probe includes a second heating element for heating the probe. The system also includes a feedback controller for maintaining the temperature of the fluid as measured by the temperature sensing probe within a preselected range by controlling the current applied to at least one of the first and/or second heating elements.

Figure 1:
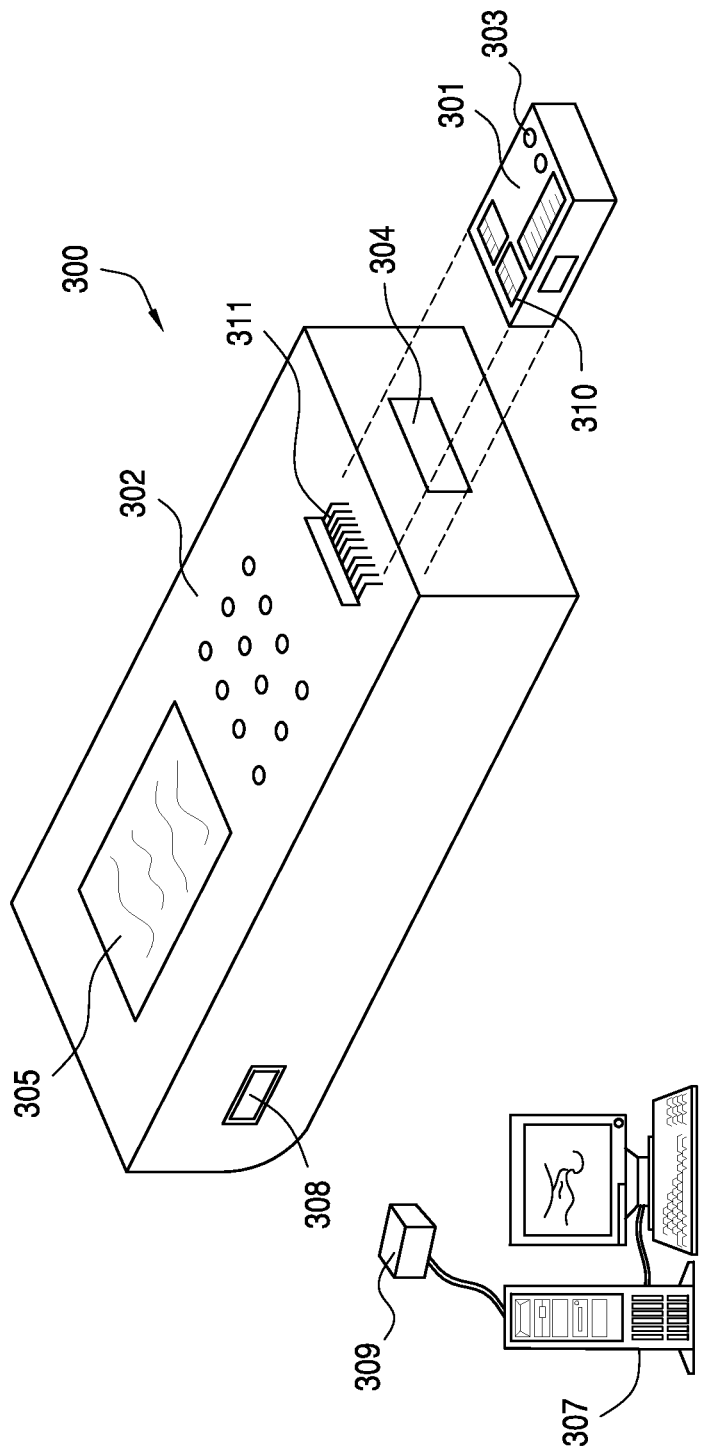
FIG. 1 shows an isometric view of a disposable sensing device, reader device, and computer system in accordance with some aspects of the invention.

The context of the thermal control system of the present invention may be understood in referenced to FIG. 1. The system 300 of the present invention may, in some embodiments, comprise a self-contained disposable sensing device or cartridge 301 and a reader device or instrument 302. A fluid sample (e.g., whole blood) to be measured is drawn into a sample entry orifice or port 303 in the cartridge 301, and the cartridge 301 may be inserted into the reader device 302 through a slotted opening 304. The reader device 302 may comprise a processor configured to perform measurements of analyte concentration within the fluid sample, as discussed herein in further detail. Measurements and determinations performed by the reader device may be output to a display 305 or other output device, such as a printer or data management system 307 via a port 308 on the reader device to a computer port 309. Transmission can also be via Wifi, Bluetooth link, infrared and the like. Note that where the sensors are based on electrochemical principles of operation, the sensors 310 (e.g., a primary sensor and optionally a reference sensor) in the cartridge 301 make electrical contact with the reader device 302 via an electrical contacts 311, which are housed within the reader device 302 and make electrical contact with contact pads adjacent the sensors 310 of the cartridge 301 after it is inserted into reader device 302. For example, the connector may be of the design disclosed in jointly owned U.S. Pat. No. 4,954,087, incorporated herein by reference in its entirety. The instrument 302 may also include a method for automatic fluid flow compensation in the cartridge 301, as disclosed in jointly owned U.S. Pat. No. 5,821,399, which also is incorporated herein by reference in its entirety. In accordance with the present invention, the system 300 comprises a thermal control scheme for regulating the temperature of the sample fluid. In preferred embodiments, first and second heating elements and the temperature sensing probe, as described below (not shown in FIG. 1), are disposed within the reader device 302, and are attached to or adjacent to the electrical contacts 311 such that the thermal control system can operate on the cartridge as desired after introduction of the cartridge 301 into reader device 302.

Thermal Control System

The present invention involves a system for measuring and controlling the temperature of a fluid, which relies upon the use of two or more heating elements. The invention also utilizes at least one temperature measuring device, such as a temperature sensing probe. At least one of the heating elements heats the temperature measuring device itself. In addition, at least one of the heating elements directly or indirectly heats the fluid. One example of indirect heating of a fluid occurs when a heating element is used to heat a substrate that is in thermal contact with the fluid. The substrate itself can be in physical contact with the fluid, or there can be other thermally conductive materials, such as a sensor, in between the substrate and the fluid. The substrate can be made of a variety of thermally conducting materials such as silicon, glass, plastic, or alumina, or derivatives thereof. One example of a heating element for heating the substrate involves a coating (e.g., thin layer or sheet) of an electrically resistive material, such as a metal, on the base of the substrate. Titanium tungsten (TiW) alloy is one example of an electrically resistive material. This resistive material can be used to heat the substrate when engaged by electrical contacts which pass a current therebetween and through the resistive material. In other embodiments, at least one heating element can physically contact the fluid. The heating elements can be powered and/or controlled by the same source or different sources.

In some embodiments, the heating elements are controlled by a feedback loop. The feedback controller can determine the temperature of the fluid from the output of the temperature sensing probe. Because heat can flow from the substrate to the temperature sensing probe tip and vice-versa, the temperature of the substrate will have an influence on the temperature of the tip. Thus the tip temperature reading can be used as feedback to control the temperature of the substrate and the fluid.

In one embodiment, a first heating element heats the substrate and fluid, and a second heating element heats the temperature sensing probe. The temperature reported by the sensing probe is then determined and the feedback control loop modifies the heating characteristics of the first heating element to increase or decrease, as appropriate, the temperature of the substrate, and directly or indirectly, the fluid. Subsequent temperature readings are periodically determined by the temperature sensing probe and the feedback control loop intermittently or continuously alters the temperature of the first heating element until the target temperature is achieved within the desired degree of uncertainty, e.g., ±0.5° C. or ±0.2° C. of the target temperature. In one embodiment, the temperature readings are determined less than every second, e.g., between every 500 ms-100 ms, or between every 100 ms-10 ms, or between every 50 ms-1 ms, or less than every 40 ms. The feedback loop preferably uses a Proportional-Integral-Derivative (PID) controller. The three parameters P, I and D are determined to adjust the response of the feedback loop to meet specific requirements such as the time to reach the target temperature or the maximum allowable degree of uncertainty. Appropriate control may be achieved by setting one or two PID parameters to zero. Alternatively, other control loop feedback algorithms may be used in lieu of a PID controller. The use of the second heating element compensates for heat lost from the temperature sensing probe to the environment that would otherwise be sourced from the heated substrate through the substrate-to-probe thermal contact and cause an error in the measurement of the temperature of the substrate.

In the above-described embodiment, the second heating element is preset to heat the sensing probe in a static manner; its characteristics are not modified by a temperature control loop. In other aspects, the second heating element may be dynamic such that its heating characteristics may be controlled by the feedback loop depending, for example, on changes in the temperature of the local environment or the length of time temperature control has been performed. For example, the current delivered to the second heating element may be reduced when the temperature of the local environment increases.

The present invention can be used in conjunction with any device that requires precise control over the temperature of a fluid, and in particular fluids of low volume. In some embodiments, the present invention can control the temperature of the fluid within a range of ±0.5° C. of a target temperature. The present invention can also be configured to control the temperature of the fluid within a range of ±0.2° C. of a target temperature. One example of a situation where the present invention might be employed is in DNA amplification or polymerase chain reaction (PCR), where a small number of copies of a piece of DNA are multiplied on a large scale. Such techniques use thermal cycling, consisting of cycles of repeated heating and cooling of the reaction for DNA melting and enzymatic replication of the DNA. The present invention might be used in this context to achieve the desired temperatures for the various cycles. Another example is an analyzer that measures any of a variety of parameters for a fluid. Such a fluid can be for example blood, plasma, serum, urine, cerebrospinal fluid, and diluted and amended forms. Such an analyzer can rely on sensors to make measurements on the fluid. An electrochemical sensor is one example. In one embodiment, the present invention is utilized in a portable blood analyzer that uses miniature cartridges to rapidly measure a variety of clinical chemistry, hematology, blood gases, coagulation and cardiac marker values on patient whole blood in emergency or acute care situations, for example, as described in U.S. Pat. No. 5,960,160, the entirety of which is incorporated herein by reference. Oxygen blood measurement, for example, is particularly sensitive to temperature as oxygen binding to hemoglobin is highly temperature dependent. This effects the dissolved concentration of oxygen in the plasma fraction of blood, which is what the sensor typically measures. Blood gas measurement systems generally require thermostatting at 37° C. (normal body temperature) to within about +/−0.2° C. Other sensors that use enzymes are also highly temperature dependent. For example, when measuring blood glucose, the rate at which the enzyme glucose oxidase consumes glucose roughly doubles with a 10° C. change in temperature. Immunosensors where the rate of an antibody-antigen binding reaction is temperature dependent also require thermostatting. The cartridges can perform a self-calibration followed by a preprogrammed electrochemical analysis on a single sample of a patient whole blood. Temperature is one among a number of variables that must be kept tightly controlled for many analysis cartridges to ensure that the analysis leads to precise and accurate results. Such cartridges might rely on a relatively small amount of fluid for measurement purposes. For example, the volume of fluid brought in contact with a sensor can be less than 1 mL, such as from 1 mL to 1 µL, or less than 1 µL. In certain embodiments, the temperature of the fluid can be maintained at a specific temperature optionally between about 25° C. and about 60° C.

Figure 2:
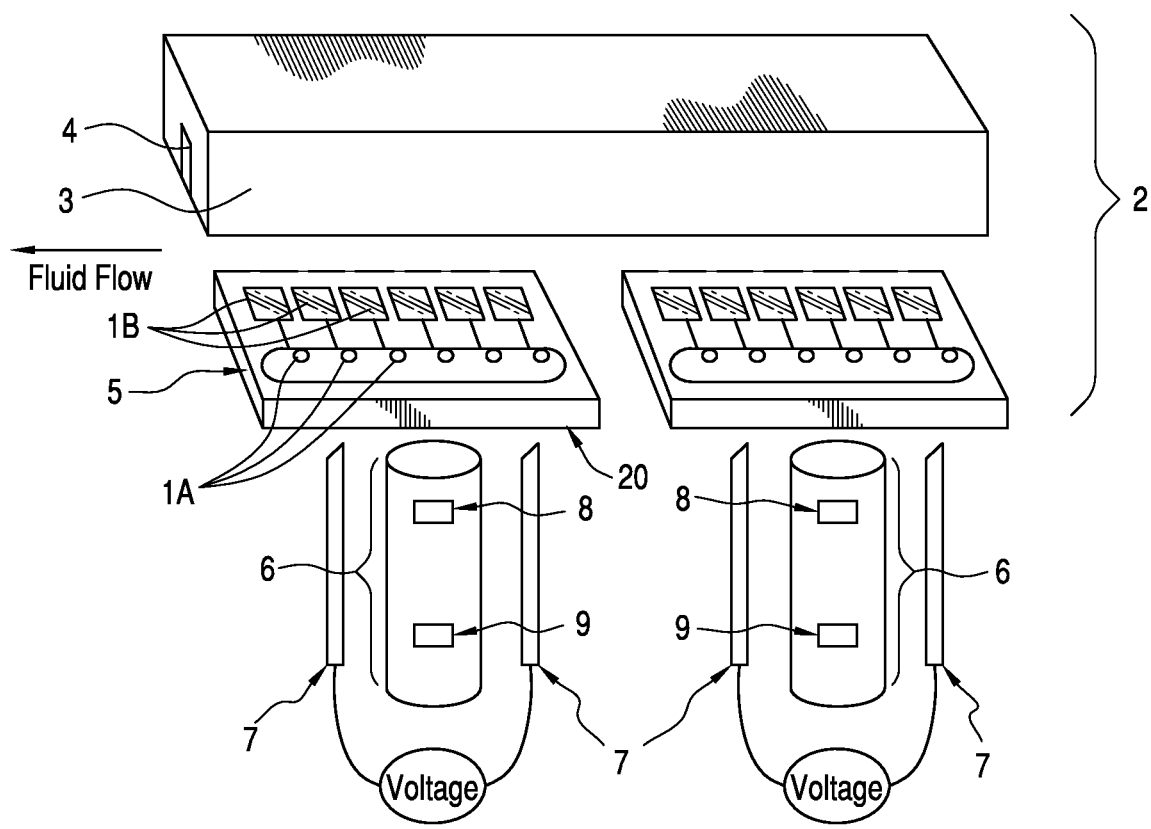
FIG. 2 is a conceptual diagram of a thermal control system used in an analyzing device for controlling the temperature of a fluid during analysis in accordance with one embodiment of the present invention.

FIG. 2 depicts a conceptual representation of an example of a physical set up utilized in a fluid analyzer to heat a fluid sample and the analyzer sensors used during the analysis to control their temperature. This example employs a multi-layer cartridge structure 2 that sandwiches the sensors 1A between an injection molded plastic cover 3 and a chip or chips 5. Only a portion of the cartridge structure 2 is shown in FIG. 2 for simplicity. Each sensor 1A has a corresponding contact pad 1B for contacting electrical contacts 7 in the reader device. The sensors can be of virtually any type, such as electrochemical, optical, mass, or thermal, but as shown are electrochemical in that they generate an electrical signal that can be detected by the electrical contacts 7 and communicated to the internal processor of the cartridge reader device.

Figure 3:
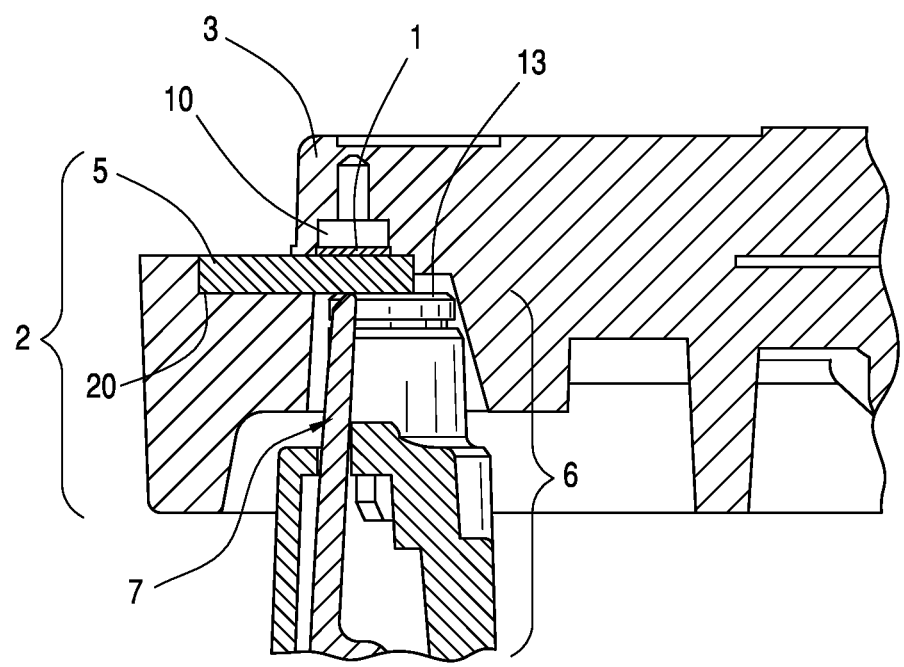
FIG. 3 is a schematic diagram of a cross-sectional view of a portable thermal control system in an analyzing device for controlling the temperature of a fluid during analysis in accordance with one embodiment of the present invention.

The plastic cover 3 can be formed of a thermal insulating material in order to minimize heat loss to the cartridge 2 and avoid transient temperature changes caused by the outside environment. Channel 4 is molded into the interior surface of cover 3, and defines a fluid flow path 10 as illustrated in FIGS. 2 and 3. The channel (or conduit) can be insulated on at least one side by plastic. The sensors 1A are optionally ion-selective electrodes positioned on a substrate 5, such as a silicon wafer. The substrate 5, or a portion thereof, can be formed of a high thermal conductor, in which case the temperature difference across the substrate 5 and the sensor 1A is negligible. The substrate preferably is less than 5 mm thick, e.g., less than 1 mm or less than 0.5 mm thick. The electrode on the top side of the sensors 1A can be sequentially exposed to a calibrant fluid (if desired) and the fluid to be analyzed during the analysis or test cycle. The temperature of the fluid directly above the sensor may be considered generally equal to the temperature of the substrate 5. In a preferred aspect, the underside of substrate 5 is coated with or has a sputtered surface comprising a thermally conductive material, such as titanium tungsten alloy (TiW). The underside of the substrate 5 can be coated, for example, with a thin resistive layer 20. TiW is an example of a material that could be used as a thin resistive layer to allow for heating of the substrate by contacting the layer with a first heating element comprising two electrical contacts 7 and applying a voltage across the contacts 7. Heat from the thin resistive layer propagates to the substrate, sensor and fluid by conduction.

During the test cycle, when fluid, such as a calibrant fluid is in contact with the sensors, one or more temperature sensing probes 6 (two in this example) are brought into contact with the underside of the substrate. Each temperature sensing probe 6 includes a thermistor 8 for measuring the temperature of the material that contacts the probe tip, in this case the underside of the substrate 5, as well as a second heating element 9, described below. The measured temperature is used as an input to a control loop in the analyzer software to maintain the temperature of the substrate 5 and sensors 1A (and hence the liquid) at or very near a target temperature, preferably for the desired period of time of the testing process, as described above. The control loop can be of any type, for example PID, proportional integral (PI), or proportional (P). According to the invention, the temperature sensing probe tip also contains a second heating element 9, such as a resistor, for heating the probe tip and reducing the temperature difference between the substrate and probe tip and thereby improving the accuracy of the temperature control. This second heating element 9 is also optionally controlled by a control loop in the analyzer software to minimize the temperature difference between the substrate and sensing probe tip.

Measurements, such as potentiometric, amperometric and/or conductometric measurements are taken on each of the sensors 1A. In a preferred aspect, a calibrant fluid is released from a fluid pouch and drawn into the analysis location over sensors 1A. A voltage is applied to the second heating element 9. The voltage applied to the resistive layer on the substrate 5 by the electrical contacts 7 of the first heating element is controlled to heat the substrate to the desired temperature. Once the signal from each of the sensors 1A stabilizes, a reading is made and immediately thereafter, the sample measurement cycle is started. The calibrant fluid is then pushed to a waste chamber (not shown) using a pump and is replaced by the sample fluid to be analyzed. The desired temperature may be a constant temperature comparable to the temperature of the calibrant fluid. In other embodiments the desired temperature may differ from the temperature of the calibrant fluid. The analyzer then waits for the sensors 1 to stabilize and measurements are made on the sample.

Figure 4:
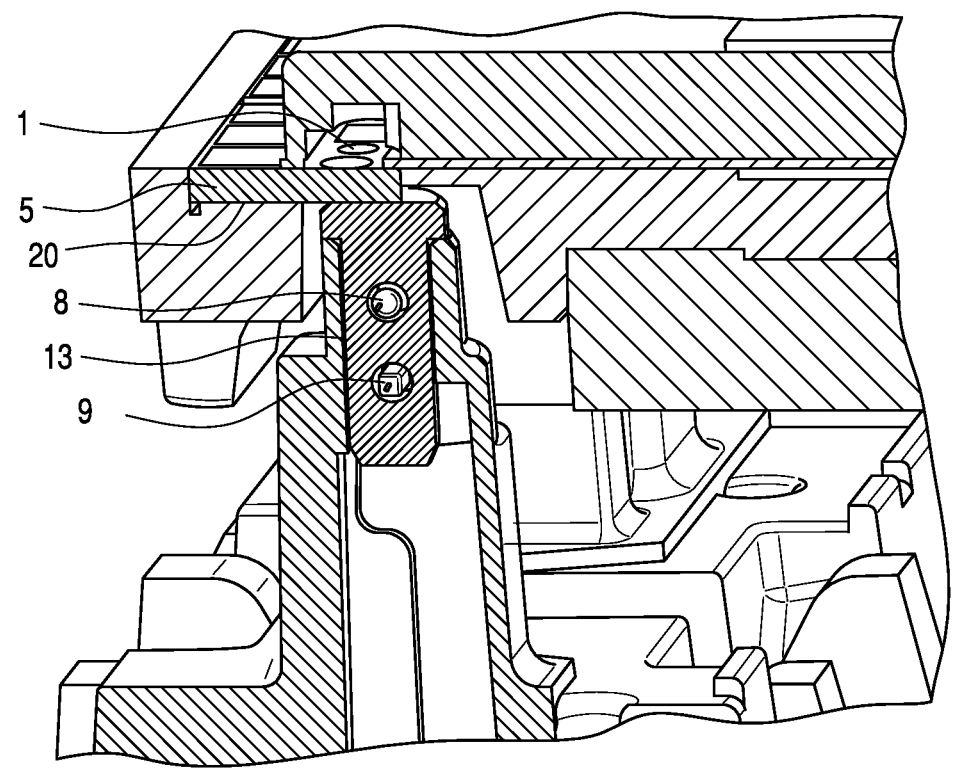
FIG. 4 is a schematic diagram of an interior view of a temperature sensing probe in a portable thermal control system for controlling the temperature of a fluid during an analysis in accordance with one embodiment of the present invention.

FIGS. 3 and 4 show an example in cross section where heating elements of a thermal probe assembly, e.g., temperature sensing probe, in a reader device are brought into direct or indirect thermal contact with the fluid in a cartridge. The probe assembly contains a temperature sensing probe 6 with a thermistor 8 disposed therein for indirectly measuring the temperature of the fluid. A first heating element 7 for supplying heat to the fluid is shown in FIG. 3 as electrical contacts (only one can be seen in the cross section of FIG. 3). In accordance with the present invention, the temperature sensing probe 6 also contains a second heating element 9 for heating the probe itself. FIG. 4 shows an example of the temperature sensing probe tip 13 (as part of the temperature sensing probe 6 in FIG. 3) comprising a cylindrical housing, with a mushroom-shaped contact plate or tip, preferably formed of a thermally conductive material such as a metal. The probe tip comprises a thermistor 8 and a second heating element 9, preferably in the form of a resistor. Wires are shown in electrical contact with the thermistor 8 for providing a temperature signal to the reader device. Wires are also shown in electrical contact with the second heating element 9.

As FIG. 3 shows and as described above, the fluid is present in a fluid channel 10 which is in contact with a sensor 1 on a substrate 5. In this example, the tip 13 of the temperature sensing probe physically contacts the substrate 5, but by virtue of the substrate 5 and sensor 1, is also in thermal contact with the fluid in the fluid channel 10. The electrical contacts 7 of the first heating element are also brought into contact with the bottom layer of the substrate 20 and can be used to heat the substrate 5 by applying a voltage between two adjacent electrical contacts 7. The bottom of the substrate 5 in contact with the electrical contacts 7 can have an electrically resistive layer 20 that generates heat when a voltage is applied between the electrical contacts 7. By heating the substrate 5, the fluid in thermal contact with the substrate 5 is also heated. The temperature sensing probe tip 13 and the electrical contacts 7 can be introduced into contact with the substrate 5 through mechanical means, such as the use of cams and/or springs (not shown).

Figure 5:
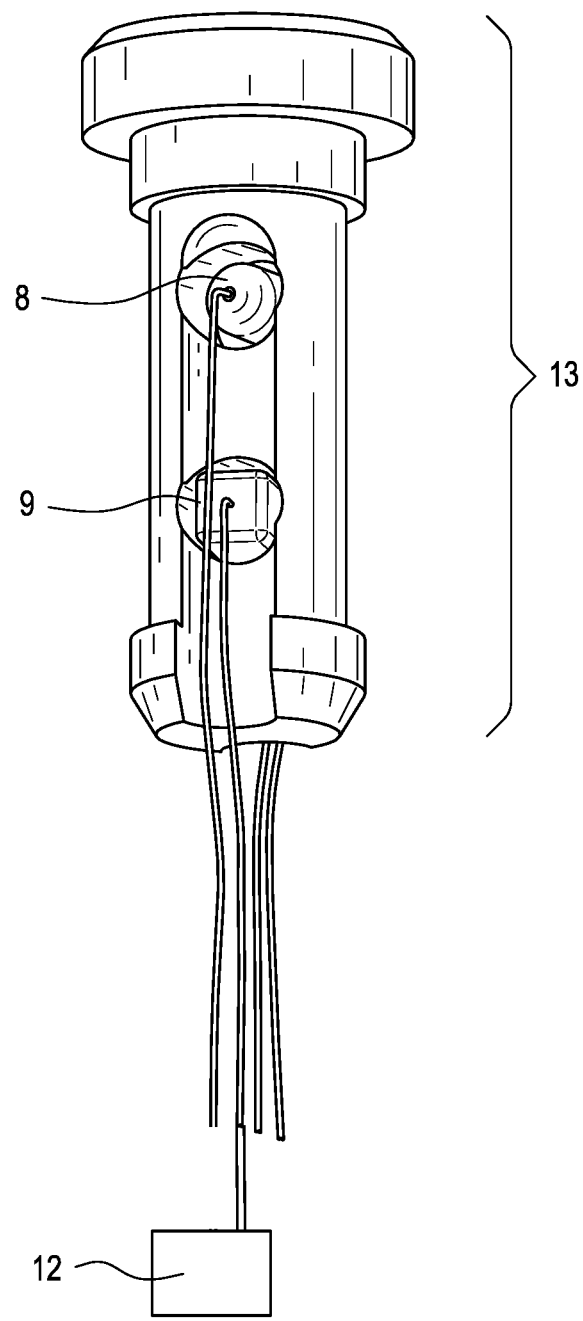
FIG. 5 is a schematic diagram of a cross-sectional view of a temperature sensing probe tip in accordance with an embodiment of the present invention.

FIG. 5 shows an interior view of the temperature sensing probe tip 13 alone, with spaces in the temperature sensing probe tip 13 for the thermistor 8 and second heating element 9. The temperature sensing probe tip can be made of a conductive material such as aluminum. The second heating element 9 is connected to a feedback controller 12 that controls the current applied to the second heating element. The same feedback controller can also control the current applied to the first heating element 7. In certain embodiments, the probe assembly may also contain another thermistor (not shown) for ambient temperature measurement.

Previous systems for controlling the temperature of the fluid in a fluid analyzer require a calibration to support the estimation of the thermal resistance between the substrate and the temperature sensing probe of the unit. This method involves using pulses in the power applied to the substrate heating element and measuring the temperature of the sensing probe tip to determine the lag time. A special thermal test cartridge with a low thermal mass thermistor attached directly to the substrate surface is used during this calibration to allow direct measurement of the temperature of the substrate, which can be used to determine the thermal resistance between the substrate and the temperature sensing probe. This measured thermal resistance and corresponding lag time comprise the calibration result. Subsequent measurements of the temperature measurement lag times using i-STAT cartridges (without thermistors attached to the substrate) are used with the calibration result to estimate the thermal resistance for each cartridge.

Using the inventive system and/or method, the use of the thermal control system can be improved while reducing the time required to obtain the estimate of the thermal contact resistance. A given temperature sensing probe will have a required tip power input to maintain the temperature sensing probe tip at constant temperature even as heat is lost to the environment. This power input requirement can be determined by measuring the power used to heat the temperature sensing probe when it is at the same temperature as the fluid and dividing by the difference between the fluid/probe temperature and the environment temperature. Once known, the value for the required tip power input can be used in any scenario to determine the appropriate setting for the secondary heating element that heats the temperature sensing probe tip. The required tip power input is multiplied by the difference between the desired fluid temperature and the environment temperature to determine the power that is to be supplied to the secondary heating element to ensure that the tip remains at the temperature of the substrate, sensor, and fluid.

Both the desired fluid temperature and the environment temperature can vary, depending on the scenario. The required tip power can be recomputed to account for variations in desired temperature, environment temperature as well as other factors.

Cartridge Design

Figure 6:
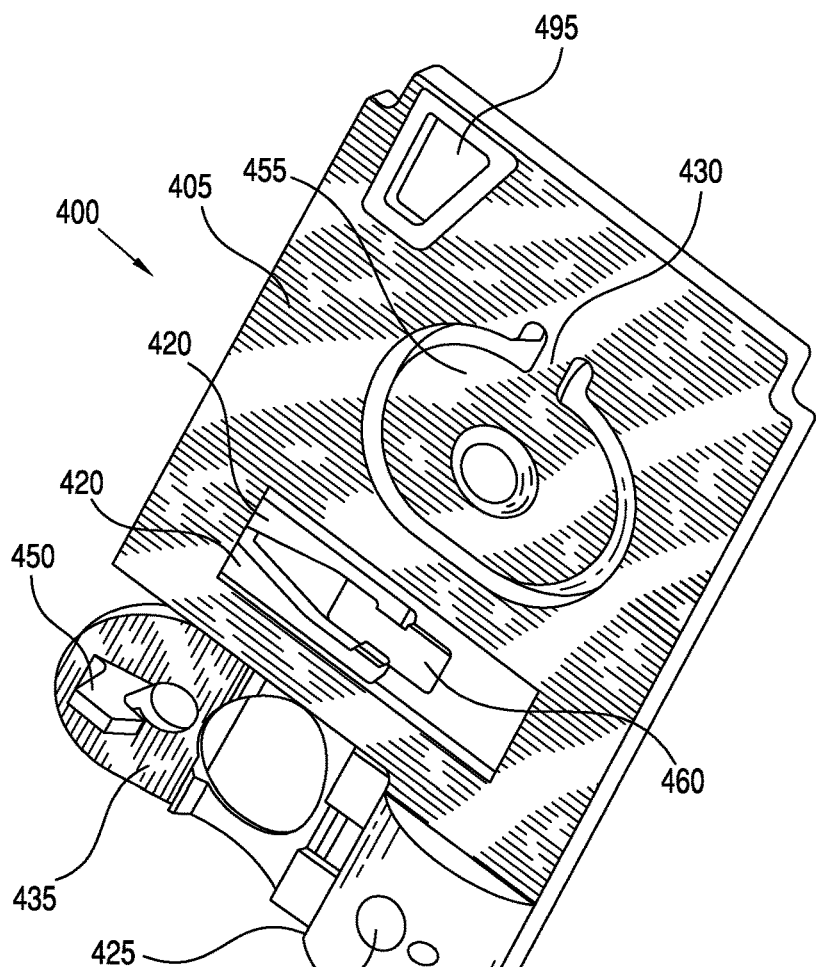
FIG. 6 shows an isometric op view of an immunosensor cartridge cover in accordance with some aspects of the invention.
Figure 7:
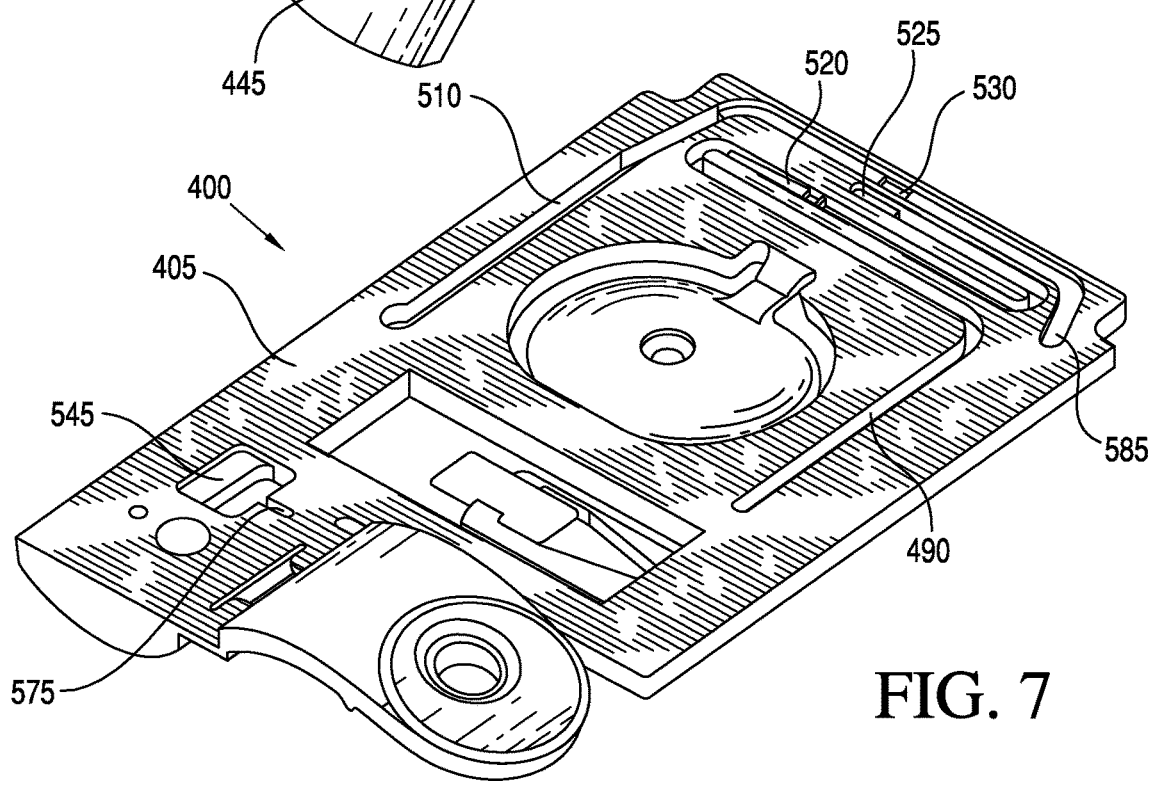
FIG. 7 shows an isometric bottom view of an immunosensor cartridge cover in accordance with some aspects of the invention.
Figure 8:
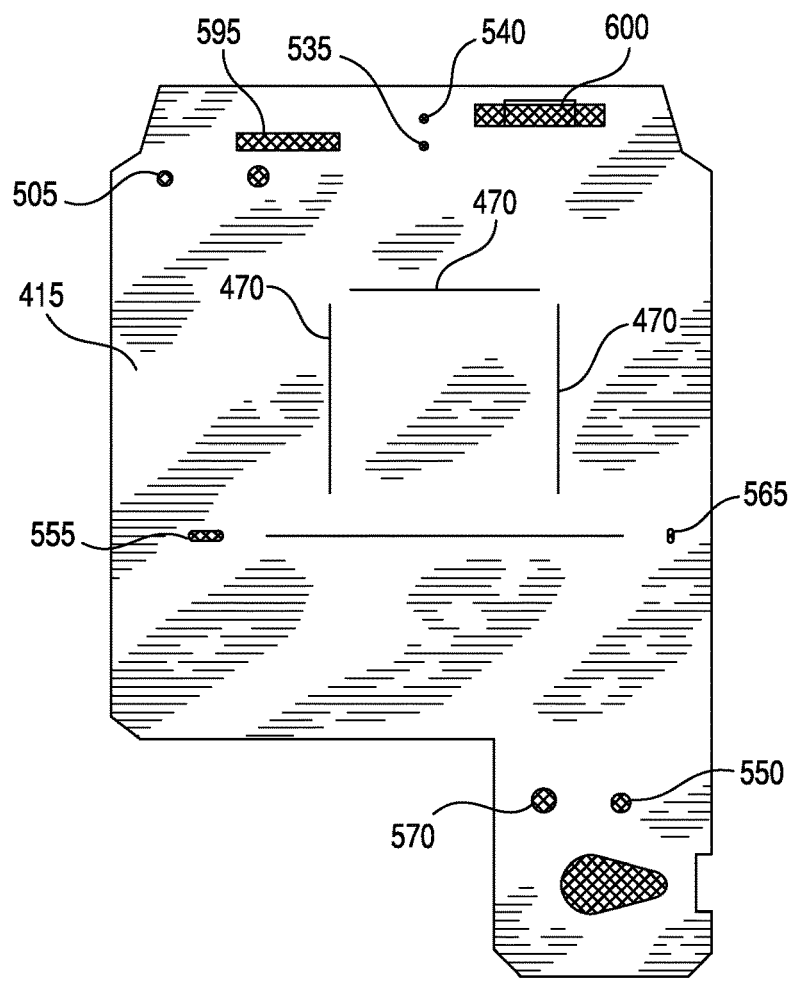
FIG. 8 shows a top view of a tape gasket in accordance with some aspects of the invention.
Figure 9:
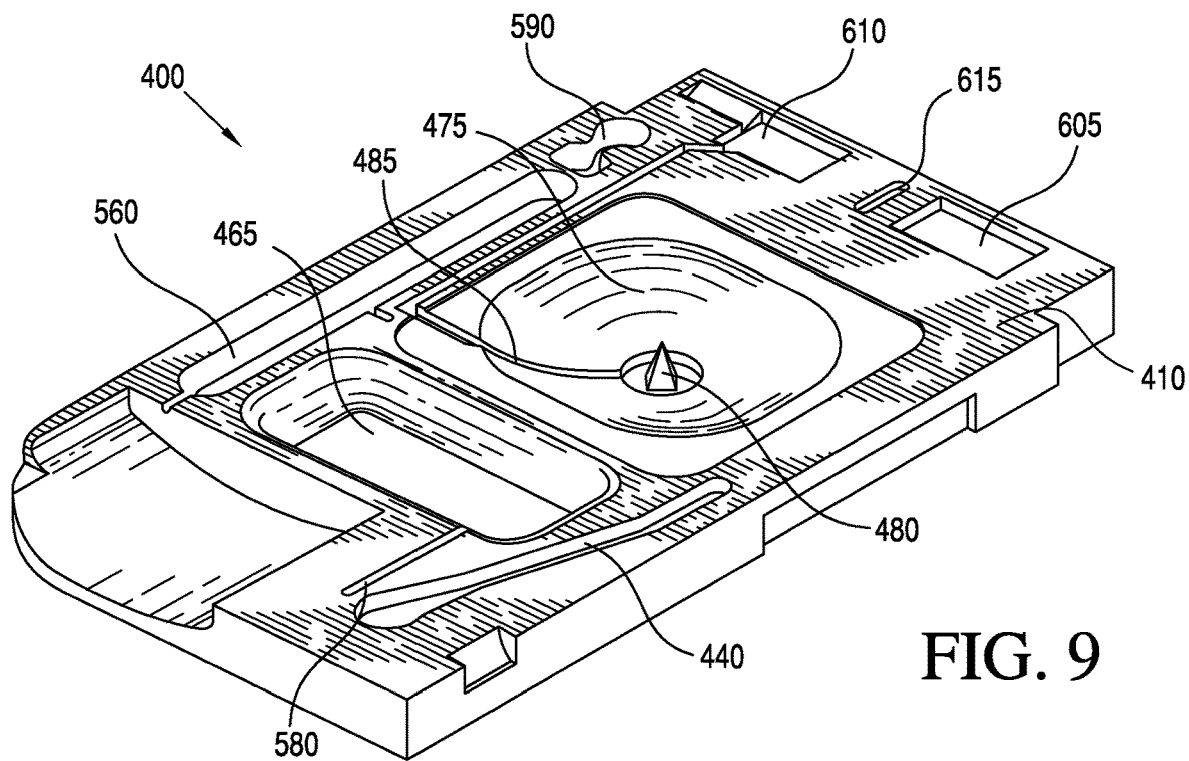
FIG. 9 shows an isometric top view of an immunosensor cartridge base in accordance with some aspects of the invention.
Figure 10:
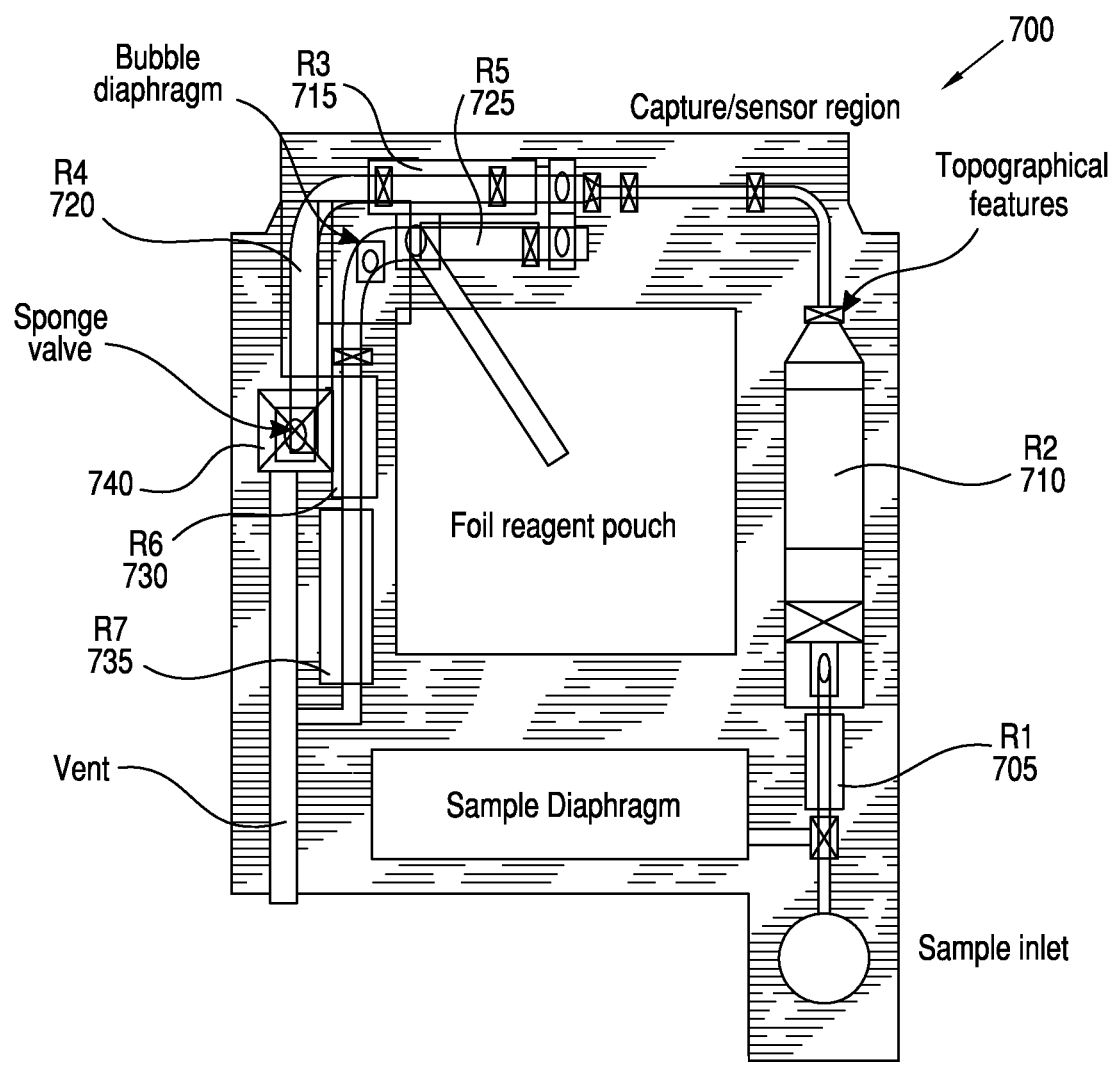
FIG. 10 shows a schematic view of the layout of an immunosensor cartridge in accordance with some aspects of the invention.

In one embodiment, as shown in FIGS. 6-9, a cartridge 400 (e.g., a disposable assay cartridge) may comprise a cover 405 (as shown in FIGS. 6 and 7), a base 410 (as shown in FIG. 9), and a thin-film adhesive gasket 415 (as shown in FIG. 8) that is disposed between the base 410 and the cover 405. The cartridge 400 may be configured for insertion into a reader device that includes the heating system of the present invention or part of this heating system, and therefore the cartridge 400 may comprise a plurality of mechanical and electrical connections (not shown) for this purpose. Advantageously, a feature of the cartridge 400 is that once a sample is loaded within the cartridge 400, analysis of the sample may be completed and the cartridge 400 may discarded without an operator or others contacting the sample.

Referring to FIG. 6, the cover 405 may be made of a rigid material, preferably plastic, and capable of repetitive deformation at flexible hinge regions 420, 425, and 430 without cracking. The cover 405 may comprise a lid 435, attached to a main body of the cover 405 by the flexible hinge 425. In operation, after introduction of a sample into a sample holding chamber 440 (as shown in FIG. 9) through a sample entry port 445, the lid 435 may be secured over an entrance to the sample entry port 445, preventing sample leakage. The lid 435 may be held in place by a hook 450.

The cartridge 400 optionally may also have a closure feature as described in jointly owned U.S. Pat. No. 7,682,833, which is hereby incorporated by reference in its entirety, for sealing the sample entry port 445 in an air-tight manner. This closure device may be slidable with respect to a body of the cartridge 400 and provides a shearing action that displaces excess sample located in the region of the sample entry port 445, reliably sealing a portion of the sample in the sample holding chamber 440 between the sample entry port 445 and a capillary stop. Specifically, the cartridge 400 may be sealed by slidably moving a sealing element over the surface of the cartridge in a manner that displaces excess fluid sample away from the sample entry port 445, seals a volume of the fluid sample within the internal fluid sample holding chamber 440, and inhibits fluid sample from prematurely breaking through the internal capillary stop.

The cover 405 may further comprise two paddles 455 and 460 that are moveable relative to the body of the cover 405, and which are attached to the cover 405 by the flexible hinge regions 420 and 430. The paddle 460 may be configured to be operated by a pumping means such that a force is exerted upon an air bladder comprised of cavity 465 (as shown in FIG. 9) and the gasket 415. Operation of the paddle 460 displaces fluid within conduits of the cartridge 400.

The paddle 455 may be configured to be operated upon by a second pumping means such that a force is exerted upon the gasket 415, which can deform because of slits 470 cut therein (as shown in FIG. 8). Deformation of the gasket 415 may transmit pressure onto a fluid-containing foil pack filled with a fluid, e.g., analysis/wash solution or fluid, located in cavity 475 (as shown in FIG. 9), rupturing the foil pack upon spike 480, and expelling fluid into conduit 485. The conduit 485 may be connected via a short transecting conduit in the base 410 to a conduit 490 (as shown in FIG. 7). The fluid fills a front of the conduit 485 first pushing fluid into a small opening in the gasket 415 that acts as a capillary stop.

Additional action in the cartridge 400 generated by mechanisms within the reading device applied to the cartridge 400 may be used to inject one or more air segments into the fluid at controlled positions within the conduit 490. The air segments may be used to wash a sensor surface of the sensor array and the surrounding conduit 490 with a minimum amount of fluid. For example, the cover 405 may further comprise a hole covered by a thin pliable film 495. In operation, pressure exerted upon the film 495 (FIG. 6) may expel one or more air segments into the conduit 490 through a small hole 505 in the gasket 415 (as shown in FIGS. 7-8).

Referring to FIG. 7, a lower surface of the cover 405 further comprises the conduit 490 and another conduit 510. The conduit 490 includes a constriction 520 that controls fluid flow by providing resistance to the flow of the fluid. Optional coatings 525 and 530, e.g., dry reagent coatings, may provide hydrophobic surfaces on the conduit 510, which together with gasket holes 535 and 540 control fluid flow between conduits 190 and 510. A recess 545 in the base may provide a pathway for air to enter and/or escape the conduit 440 through hole 550 in the gasket.

Referring to FIG. 8, the thin-film gasket 415 comprises various holes and slits to facilitate transfer of fluid and air between conduits within the base 405 and the cover 410, and to allow the gasket 415 to deform under pressure where necessary. Specifically, a hole 555 may permit fluid to flow from the conduit 490 into a waste chamber 560, a hole 565 may comprise a capillary stop between conduits 440 and 510, a hole 570 may permit air to flow between a recess 575 (as shown in FIG. 7) and a conduit 580 (as shown in FIG. 9), the hole 550 provides for air movement between the recess 545 and the conduit 440, and the hole 505 permits fluid to flow from a conduit 585 (as shown in FIG. 7) to the waste chamber 560 via optional closeable valve 590 (as shown in FIG. 9). Holes 595 and 600 permit a plurality of electrodes (e.g., the primary sensor and optionally the reference sensor) that are housed within cutaways 605 and 610, respectively, to contact fluid within the conduit 490. In a specific embodiment, cutaway 610 houses a ground electrode, and/or a counter-reference electrode, and cutaway 605 houses at least one analyte sensor (e.g., the primary sensor), and optionally, a reference sensor.

Referring to FIG. 9, the conduit 440 may be configured as a sample holding chamber that connects the sample entry port 445 to the conduit 510 in the assembled cartridge 400. The cutaway 605 may house at least one analyte sensor (e.g., the pair of electrodes), or an analyte responsive surface, together with an optional conductimetric sensor or sensors. The cutaway 610 may house a ground electrode if needed as a return current path for an electrochemical sensor, and may also house an optional conductimetric sensor. A cutaway 615 may provide a fluid path between gasket holes 535 and 540 such that fluid may pass between the conduits 490 and 510. Recess 475 houses a fluid-containing package, e.g., a rupturable pouch, in the assembled cartridge 400 that may be pierced by the spike 480 because of pressure exerted upon paddle 455 upon insertion of the cartridge 400 into the reading device. Fluid from the pierced package flows into the conduit 485. The air bladder may be comprised of the recess 465, which is sealed on its upper surface by the gasket 415. The air bladder may be one embodiment of a pump means, and may be actuated by pressure applied to the paddle 460, which displaces air in the conduit 580 and thereby displaces the sample from the sample chamber 440 into the conduit 510.

In some embodiments, a metering means may optionally comprise the sample chamber 440 bounded by the capillary stop 565 and having along the chamber 440 length an air entry point (gasket hole 550) from the bladder. Air pressure exerted at the gasket hole 550 drives a metered volume of the sample past the capillary stop 565. Therefore, a metered volume of sample may be predetermined by a volume of the sample chamber 440 between the air entry point 550 and the capillary stop 565. An amount of the sample corresponding to this volume may be displaced into the conduit 510 when the paddle 460 is displaced. This arrangement may therefore provide a metering means for delivering a metered amount of an unmetered sample into the various downstream conduits of the cartridge 400. The metering may be advantageous in some embodiments if quantitation of the analyte is required. Thus, an operator may be relieved of accurately measuring the volume of the sample prior to measurement saving time, effort, and increasing the accuracy and reproducibility.

A schematic diagram of the features of the cartridge 700 and components therein is provided in FIG. 8. Specifically, in preferred embodiments, one or more of the conduits and/or the sample chamber 705-735 may be coated with dry reagents to amend the sample or fluid as discussed herein. The sample or fluid may be passed at least once over the dry reagent to dissolve the dry reagent. Reagents that may be used to amend samples or fluid within the cartridge include urease and/or other enzymes, a water soluble protein, a buffer, scavengers, or combinations thereof, antibody-enzyme conjugates, signal antibodies for binding the analyte in the immunoassay or for use in competitive assays, and/or blocking agents that prevent either specific or non-specific binding reactions among assay compounds, among other possible reagents. A surface coating that may not be soluble but helps prevent non-specific adsorption of assay components to the inner surfaces of the cartridge 700 may also be provided.

For example, within a segment of the sample or fluid, an amending substance may be preferentially dissolved and concentrated within a predetermined region of the segment. In one embodiment, this may be achieved through control of the position and movement of the segment within the conduits and the sample chamber 705-735. Therefore, if only a portion of a segment, such as the leading edge, is reciprocated over the amended substance, then a high local concentration of the substance can be achieved close to the leading edge. Alternatively, if a homogenous distribution of the substance is desired, for example if a known concentration of an amending substance is required for a quantitative analysis, then further reciprocation of the sample or fluid may result in mixing and an even distribution.

In preferred embodiments, a closeable valve 740 may be provided between a first conduit and the waste chamber. In one embodiment, the valve 740 may be comprised of a dried sponge material that is coated with an impermeable substance. In operation, contacting the sponge material with the sample or a fluid may result in swelling of the sponge to fill the cavity (e.g., the valve 590 cavity as shown in FIG. 9), thereby substantially blocking further flow of liquid into the waste chamber. Furthermore, the wetted valve 740 may also be configured to block the flow of air between the first conduit and the waste chamber, which permits a first pump means connected to the sample chamber to displace fluid within a second conduit, and to displace fluid from the second conduit into the first conduit in the following manner.

After the sample is exposed to the sensor array (e.g., the primary electrode and optionally the reference electrode) for a controlled time, the sample may be moved into a post-analytical conduit where the sample may be amended with another reagent. The sample may then be moved back to the sensor array and a second reaction period may begin. Alternately, the post-analysis conduit may serve simply to separate the sample segment from the sensor array. Within the post-analysis conduit may be a single closeable valve that connects an air vent of the sensor conduit to a diaphragm air pump. When the single closeable valve closes, the sample may be locked in the post analytical conduit and cannot be moved back to the sensor array.

In one embodiment of the present invention, the sample and a fluid, e.g., a combined wash and enzyme substrate delivery fluid, may contact the sensor array (e.g., the pair of electrodes and optionally the reference electrode) at different times during an assay sequence. The sample and the fluid may also be independently amended with other reagents or compounds present initially as dry coatings within respective conduits of a test device, e.g., the cartridge. Controlled motion of the fluid by the above-described pumping means within the cartridge further permits more than one substance to be amended into each fluid whenever the sample or the fluid is moved to a new region of the conduit. In this manner, multiple amendments to each fluid may be accommodated, extending the complexity of automated assays that can be performed in the cartridge. Therefore, the utility of the system may be enhanced.

In some aspects of the invention, the cartridge may be provided with a barcode with factory set information including equations to be used and required test coefficients. The reader device, into which the cartridge is inserted to run the test, may thus be equipped with a barcode reader. A selection of equations may be embedded in software of the reader device. For example, the coefficients for the cartridge may differ, where different lots of cartridges are manufactured, each lot having slightly different factory-determined characteristics. The coefficients for the cartridge, from whichever manufacturing lot the cartridge is drawn, are conveyed to the reader device for use in one or more of the equations, for that particular cartridge test. For example, if a given digit of the cartridge barcode is set to 1, the reader device may set a predetermined coefficient to zero, whereas other digits may code for different coefficients or select a kinetic model to be used, e.g., an immunoassay model formulated by analogy to the well-known Michaelis-Menton enzyme kinetics. In this manner, a specific and appropriate thermal testing profile can be selected, for example from a lookup table in the software of reader device, and applied for the cartridge being used.

In an alternative embodiment, as shown in FIGS. 11A-11E, the cartridge 900 may include a housing that comprises two complimentary halves of a cartridge (e.g., the cover 901 and the base 902), which can be bonded together to abut and attach the two complimentary interior surfaces of the two halves in a closed position. In some embodiments, the cover 901 and the base 902 are injection molded, for example, by machine as disclosed in U.S. patent application Ser. No. 13/530,501, filed on Jun. 22, 2012, which is incorporated herein by reference in its entirety. Preferably, the cover 901 is injection molded where a first substantially rigid zone 920 is formed in a first injection molding step and a substantially flexible zone 922 is formed in an additional injection molding step. Preferably, the base 902 is injection molded where a second substantially rigid zone 924 is formed in a first injection molding step.

As shown in FIGS. 11A-11E, the substantially rigid zones 920 and 924 of the cover 901 and the base 902, respectively, are preferably each a single contiguous zone; however, the molding process can provide a plurality of non-contiguous substantially rigid zones. The substantially flexible zone 922 is preferably a set of several non-contiguous zones. For example, the substantially flexible zone 922 around a displaceable membrane 925 may be separate and distinct from the substantially flexible zone at a closeable sealing member 928. Alternatively, the substantially flexible zone may comprise a single contiguous zone.

In a preferred embodiment, the cartridge housing comprises a sensor recess 930 in a portion of the substantially flexible zone. An advantage is that the sensors 935 (e.g., the primary sensor and optionally the reference sensor preferably each of a size of about 0.3×0.4 cm), which are disposed in the sensor recess 930 preferably are made on a silicon wafer substrate, which is relatively brittle. Thus, providing a substantially flexible sensor recess 930 results in a suitable support that can protect the sensor from cracking during assembly. Note that other non-silicon based sensors may be used, e.g., those made on a plastic substrate; however, a preferred embodiment uses sensors of the type described in U.S. Pat. Nos. 5,200,051; 5,514,253; and U.S. Pat. No. 6,030,827, the entireties of which are incorporated herein by reference. In addition to being substantially flexible, sensor recess 930 may be best selected to form a liquid-tight and/or air-tight seal around the sensor perimeter, thereby ensuring that liquids do not leak out of the conduit that covers the sensor in the fully assembled cartridge. In an alternative embodiment, sensor recess 930 can be formed in a portion of the substantially rigid zone of either or both of the cover or the bottom of the housing. In this aspect, a liquid-tight and/or air-tight seal optionally may be formed by the double-sided adhesive sheet 415 or gasket (as shown in FIG. 8).

With regard to overall dimensions, a preferred embodiment of the molded parts shown in FIGS. 11A-11E include the cover 901 with dimensions of about 6.0 cm×3.0 cm×0.2 cm and the base 902 with dimensions of about 5.0 cm×3.0 cm×0.2 cm to provide a cartridge 900 with dimensions of about 6.0 cm×3.0 cm×0.4 cm. In terms of ranges, the cartridge 900 optionally has a length of from 1 to 50 cm, e.g., from 5 to 15 cm, a width of from 0.5 to 15 cm, e.g., from 1 to 6 cm, and a thickness of from 0.1 to 2 cm, e.g., from 0.1 to 1 cm.

Amperometric Working Electrode Fabrication

Figure 12:
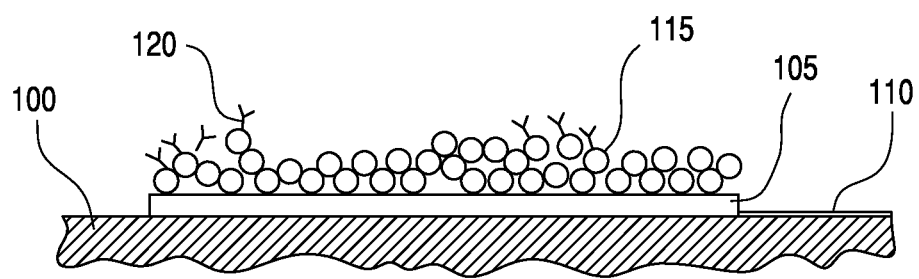
FIG. 12 shows a side view of the fabrication of an immunosensor in accordance with some aspects of the invention.

A microfabricated sensor array with at least one amperometric working electrode is shown in FIG. 12. In certain embodiments, the microfabricated sensor array may comprise a pair of immunosensors or electrodes comprising a primary sensor or electrode and optionally a reference sensor or electrode. For example, the immunosensors or electrodes may be fabricated as adjacent structures, respectively, on a chip or substrate made of silicon for example.

In the certain embodiments, the electrodes may be formed with gold surfaces coated with a photodefined layer of polyimide. For example, wafer-level microfabrication of an embodiment of the sensor array may be achieved as follows. A planar non-conducting substrate 100 may be used as a base for the sensor array. A conducting layer 105 may be deposited on the substrate 100 by conventional means or microfabrication known to those of skill in the art to form at least one electrode. The conducting layer 105 may comprise a noble metal such as gold or platinum, although other unreactive metals such as iridium may also be used, as many non-metallic electrodes of graphite, conductive polymer, or other materials may also be used.

For example, a base electrode may comprise a square array of 5-10 μm gold disks, e.g., 7 μm gold disks, on 15 μm centers. The array may cover a region, e.g., a circular region, approximately 300 to 900 μm in diameter, optionally 600 μm in diameter, and may be formed by photo-patterning a thin layer of the polyimide of thickness 0.35 μm over a substrate made from a series of layers comprising Si, $SiO_2$, TiW, and/or Au, or combinations thereof. The array of microelectrodes affords high collection efficiency of electroactive species with a reduced contribution from any electrochemical background current associated with the capacitance of the exposed metal. In particular, regularly spaced openings in the insulating polyimide layer define a grid of small gold electrodes.

Microfabrication techniques (e.g. photolithography and plasma deposition) may be utilized for construction of the multilayered sensor structures in confined spaces. For example, methods for microfabrication of the electrochemical immunosensors on silicon substrates are disclosed in U.S. Pat. No. 5,200,051, which is hereby incorporated by reference in its entirety. These include dispensing methods, methods for attaching biological reagent, e.g., antibodies, to surfaces including photoformed layers and microparticle latexes, and methods for performing electrochemical assays.

The microfabricated sensor array may also comprise an electrical connection 110 and a biolayer 115, which are deposited onto at least a portion of the conducting layer 105 and/or the non-conducting substrate 100. The biolayer 115 may include a porous layer comprising a surface with a sufficient amount of a molecule 120 (e.g., the immobilized antibody and/or the microparticle reagent) that may either bind to an analyte of interest, or respond to the presence of such an analyte by producing a change that is capable of measurement.

Optionally, a permselective screening layer may be interposed between the conducting layer 105 and the biolayer 115 to screen electrochemical interferents as described in U.S. Pat. No. 5,200,051. In particular, the electrodes described herein may be manufactured to optimize a signal-to-noise ratio, or amperometric background signal. For example, an intervening polyvinyl alcohol (PVA) layer of about 0.5-5.0 μm thickness (preferably 0.6-1.0 μm) may be placed between the electrodes and the biolayer or antibody reagent layer significantly attenuating the background component, as described in U.S. Pat. No. 7,723,099, which is hereby incorporated by reference in its entirety. An advantage of PVA as the background-reducing layer is that noise is reduced without appreciably affecting the Faradaic component of the signal. While the PVA layer reduces the diffusion coefficient of small molecules by about 50% it has been found that it does not change the current at the coated electrodes, for two reasons. First, with PVA layers of about 1 micron thickness, the detected electroactive species is present in a diffusion layer of at least ten times that thickness, so there is little decrease in transport due to the PVA layer. Second, a steady-state current is measured in the immunosensor, which is effectively independent of the transport rate and electrode kinetics, but is a function of the enzymatic rate of production of the detectable species, such as p-aminophenol generated from p-aminophenylphosphate by the enzyme ALP (attached to the signal antibody).

The porous PVA layer may be prepared by spin-coating an aqueous mixture of PVA plus a stilbizonium photoactive, cross-linking agent over the microelectrodes on the wafer.

The spin-coating mixture optionally includes bovine serum albumin (BSA). The spin-coating mixture may then be photo-patterned to cover only a region above and around the sensor arrays, and preferably has a thickness of about 0.6 μm.

In specific embodiments, the biolayer 115 may be formed from latex beads of specific diameter in the range of about 0.01 to 5.0 μm. The beads may be modified by covalent attachment of any suitable molecule consistent with the above definition of the biolayer (as discussed in further detail below). Many methods of attachment exist in the art, including providing amine reactive N-hydroxysuccinimide ester groups for the facile coupling of lysine or N-terminal amine groups of proteins. Such modified fragments are generated by oxidation, reduction, deletion, addition or modification of at least one amino acid, including chemical modification with a natural moiety or with a synthetic moiety. Preferably, the molecule binds to the analyte specifically and has an affinity constant for binding analyte ligand of about $1\times10^{-7}$ to $1\times10^{-15}$.

In one embodiment, the biolayer 115 comprising microparticle beads having surfaces that are covalently modified by a suitable molecule, may be affixed to the sensors by the following method. A microdispensing needle may be used to deposit onto a surface of the electrode or a photo-patterned PVA permselective layer covering the electrode a small droplet of the microparticle reagents. Specifically, in order to bind the microparticle reagents to the electrode, a droplet of about 0.4 nL comprising about 1% solids (i.e., the microparticles) in 0.08% Tween 20 may be microdispensed (e.g., using the method and apparatus of U.S. Pat. No. 5,554,339, which is incorporated herein by reference in its entirety) onto a surface of the electrode or a photo-patterned PVA permselective layer covering the electrode. The droplet may then be allowed to dry. The adherence of the dried microparticles particles to the porous layer substantially prevents dissolution of the microparticles into the fluid sample or the washing fluid. However, in some embodiments additional coupling chemistry may be used to ensure bead immobilization on the porous layer and/or the immunosensors. Such techniques are known in the art.

Processes for Target Analyte Detection in a Temperature Controlled Fluid

In some embodiments, the invention is a process for using a heating system to aid in the determination of the presence and/or concentration of a target analyte in a fluid sample. The process may include introducing an unmetered fluid sample into the sample chamber 440 of the cartridge 400 through the sample entry port 445 (as shown in FIGS. 6-9). Capillary stop 565 prevents passage of the fluid sample into conduit 510 at this stage, and conduit 440 is filled with the sample. Lid 435 is closed to prevent leakage of the sample from the cartridge. The cartridge may then be inserted into the reading device, as further disclosed in U.S. Pat. No. 5,821,399, which is incorporated herein by reference in its entirety. Insertion of the cartridge into the reading apparatus activates a mechanism, which punctures the fluid-containing package located at recess 475 when the package is pressed against spike 480. Fluid is thereby expelled into the conduits 485 and 490, arriving in sequence at the sensor region. The constriction 520 prevents further movement of fluid because residual hydrostatic pressure is dissipated by the flow of fluid via the conduit 585 into the waste chamber 560.

In a second step, operation of a pump means applies pressure to the air-bladder comprised of cavity 465, forcing air through the conduit 580 and into conduit 440 at a predetermined location. Capillary stop 565 delimits a metered portion of the original sample. While the sample is within sample chamber 440, it is preferably amended with a compound or compounds (e.g., enzymes, a water soluble protein, a buffer, scavengers, or a combination thereof) present initially as a dry coating or layer(s) on the inner surface of the chamber or conduits. The metered portion of the sample is then expelled through the capillary stop 565 by air pressure produced within air bladder comprised of cavity 465. The sample passes into the sensor conduit and into contact with the pair of electrodes and optionally the reference electrode located within the cutaway 605.

To promote binding of the analyte, the sample containing the analyte may optionally be passed repeatedly over the electrodes in an oscillatory motion. Preferably, an oscillation frequency of between about 0.2 and 2 Hz is used, most preferably 0.7 Hz. After a period, e.g., 10 minutes, for the analyte/enzyme-antibody conjugate complex to bind to the electrodes, the sample may be ejected by further pressure applied to the air bladder comprised of cavity 465, and the sample passes to waste chamber 560. A wash step next removes non-specifically bound enzyme-conjugate from the sensor chamber. Fluid in the conduit 490 may be moved by a pump means, into contact with the sensors. The analysis fluid may be pulled slowly until a first air segment is detected at a conductivity sensor. Note that it may be an object of the invention that the rinsing is not sufficiently protracted or vigorous as to promote dissociation of specifically bound analyte or analyte/antibody-enzyme conjugate complex from the sensors.

Use of a cartridge with a closeable valve, preferably located between the sensor chamber and the waste chamber, is herein illustrated by an embodiment in which the concentration of an analyte is determined within a fluid sample, which is introduced into the sample chamber of said cartridge. In the following time sequence, time zero (t=0) represents the time at which the cartridge is inserted into the cartridge reading device. Times are given in minutes. Between t=0 and t=1.5, the cartridge reading device makes electrical contact with the electrodes/sensors through pads, and performs certain diagnostic tests. Insertion of the cartridge perforates the foil pouch introducing fluid into a conduit as previously described. The diagnostic tests determine whether fluid or sample is present in the conduits using the conductivity electrodes; determine whether electrical short circuits are present in the electrodes; and ensure that the sensor and ground electrodes are thermally equilibrated to, preferably, 37° C. prior to the analyte determination.

While the fluid is in contact with the sensors its temperature can be controlled using embodiments of the present invention. For example, the assay can be run in a system as in FIGS. 3-5 where the sample and other fluids and reagents are thermostated at a given temperature, e.g., 37° C., using a heating system with at least two heating elements, one that directly or indirectly heats the fluid, and a second heating element 9 that heats the temperature sensing probe. A feedback controller, preferably in the reader device, is employed to control the temperature of either or both the first and/or second heating elements in order to maintain a substantially constant fluid temperature, as desired.

Between t=1.5 and t=6.75, a metered portion of the fluid sample may be used to contact the electrodes/sensors as described above. The edges defining the forward and trailing edges of the sample are reciprocally moved over the sensor region at a frequency that is preferably between 0.2 to 2.0 Hz, and is most preferably 0.7 Hz. During this time, the amending reagent and enzyme-antibody conjugate dissolves within the sample, as previously described. The amount of enzyme-antibody conjugate that is coated onto the conduit is selected to yield a concentration when dissolved that is preferably higher than the highest anticipated analyte concentration, and is most preferably six times higher than the highest anticipated analyte concentration in the sample.

Between t=6.75 and t=10.0 the sample may be moved into the waste chamber via the closeable valve, preferably wetting the closeable valve and causing it to swell and close. The seal created by the closing of the valve permits the first pump means to be used to control motion of fluid from the sensor conduit to the post analysis conduit. After the valve closes and any remaining sample is locked in the post analysis conduit, the analyzer plunger retracts from the flexible diaphragm of the pump means creating a partial vacuum in the sensor conduit. This forces the analysis fluid through the small hole in the tape gasket and into a short transecting conduit in the base. The analysis fluid is then pulled further and the front edge of the analysis fluid is oscillated across the surface of the sensor chip in order to shear the sample near the walls of the conduit. A conductivity sensor on the sensor chip may be used to control this process. The efficiency of the process may be monitored using the amperometric sensors through the removal of unbound enzyme-antibody conjugate which enhances the oxidation current measured at the electrode when the enzyme substrate is also present. The amperometric electrodes may be polarized versus the silver chloride reference-ground electrode. The efficiency of the wash is optimally further enhanced by introduction into the fluid of one or more segments that segment the fluid within the conduit as previously described. Following removal of wash fluid from the sensor channel leaving a thin layer of fluid over the two sensors, measurement of each sensor response is recorded and the concentration of analyte determined as described above.

While the invention has been described in detail, modifications within the spirit and scope of the invention will be readily apparent to those of skill in the art. In addition, it should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A thermal control system for controlling a temperature of a fluid, comprising:
   a biological fluid having a thermal mass;
   a cartridge comprising:
      a thermally conductive substrate having a thermal mass in thermal contact with the fluid;
   and an instrument comprising:
      a first heating element configured to contact said substrate and configured to heat said fluid;
      a temperature sensing probe configured to measure the temperature of said fluid and comprising: a temperature sensing probe tip having a thermal mass, a thermistor, and a second heating element comprising a resistor located in the tip of the temperature sensing probe beneath the thermistor and configured for heating the probe tip and compensating heat lost from the probe; and
      a feedback controller as part of the thermal control system for maintaining the temperature of the fluid as measured by the temperature sensing probe within a preselected range by controlling a current applied to at least one of the first or second heating elements, and wherein the temperature sensing probe tip has a thermal mass;
   wherein the thermal mass of the temperature sensing probe tip is greater than the thermal mass of said fluid.

2. The control system of claim 1, wherein the temperature sensing probe indirectly measures the temperature of said fluid by measuring a temperature of the substrate.

3. The control system of claim 1, further comprising at least one electrochemical sensor located on the substrate and contacting said fluid.

4. The control system of claim 3, wherein the at least one electrochemical sensor is configured to make potentiometric, amperometric, or a conductometric measurement of the fluid.

5. The control system of claim 3, wherein the fluid has a volume from 1.mu.L to 1 mL.

6. The control system of claim 1, further comprising electrical contacts for connecting to said first heating element and delivering current to said first heating element.

7. The control system of claim 6, wherein the current delivered to said first heating element is delivered by a battery.

8. The control system of claim 1, wherein the substrate is selected from the group consisting of silicon, glass, plastic and alumina.

9. The control system of claim 1, wherein the substrate has a metal coated bottom.

10. The control system of claim 9, wherein said metal comprises titanium tungsten alloy.

11. The control system of claim 1, wherein the temperature sensing probe tip is made of aluminum.

12. The control system of claim 1, wherein the fluid is housed in a conduit insulated on at least one side by plastic.

13. The control system of claim 1, wherein the fluid is selected from the group consisting of a calibration fluid, a reagent containing fluid, a wash fluid, blood, plasma, serum, urine, cerebrospinal fluid, and diluted and amended forms thereof.

14. The control system of claim 1, wherein the system is configured to maintain the temperature of the fluid within a range of ±0.2° C.

15. The control system of claim 1, wherein the temperature of the fluid is maintained between 25° C.-60° C.

16. The control system of claim 1, wherein the substrate is less than 1 mm thick.

17. The control system of claim 1, further comprising a pump for displacing said fluid from said substrate and positioning a second fluid over said substrate.

18. The control system of claim 1, further comprising a pump configured for moving the biological fluid.

* * * * *